Sept. 17, 1940.   C. C. FARMER   2,215,351
BRAKE SHOE MOUNTING
Filed Sept. 27, 1938   3 Sheets-Sheet 1

INVENTOR
CLYDE C. FARMER
BY
ATTORNEY

Sept. 17, 1940.   C. C. FARMER   2,215,351
BRAKE SHOE MOUNTING
Filed Sept. 27, 1938   3 Sheets-Sheet 2

INVENTOR
CLYDE C. FARMER
BY
ATTORNEY

Sept. 17, 1940.   C. C. FARMER   2,215,351
BRAKE SHOE MOUNTING
Filed Sept. 27, 1938   3 Sheets-Sheet 3

INVENTOR
CLYDE C. FARMER
BY
ATTORNEY

Patented Sept. 17, 1940

2,215,351

UNITED STATES PATENT OFFICE 2,215,351

BRAKE SHOE MOUNTING

Clyde C. Farmer, Pittsburgh, Pa., assignor to The Westinghouse Air Brake Company, Wilmerding, Pa., a corporation of Pennsylvania Application September 27, 1938, Serial No. 231,872

15 Claims. (Cl. 188—207)

This invention relates to brakes for railway vehicle trucks, and more particularly to a brake shoe mounting for a railway truck.

On a railway car truck of the passenger type embodying a frame supported on springs carried by the usual equalizing bars and equipped with clasp brakes, the brake shoes are customarily suspended below the horizontal center lines of the wheels by means of hanger members pivotally connected to the frame, so that the total weight of the shoes and hanger members is transmitted to the wheels through the medium of the springs. It has been found that when brake shoes so mounted are applied to the wheels of the truck with maximum force while the vehicle is traveling at high speed, resultant forces tend to cause the shoes to seek positions farther down on the treads of the wheels, thereby pulling the frame downwardly against the springs. These extraordinary forces may in extreme cases result in causing the frame to settle into contact with unsprung members of the truck, rendering the springs entirely ineffective to permit the necessary freedom for relative motion of the wheels and the frame members normally supported by the springs.

Undesired results of such overloading of the truck springs and abnormal displacement of the frame members include not only hard riding in the vehicle and dangerous stresses on the truck members, but also such variance of the normal forces acting between the wheels and the rails as may increase the tendency of the braked wheels to slide. The undesired action of the truck frame as above described may cause further difficulty on vehicles equipped with air brakes of the type in which brake cylinder pressure is automatically controlled by a speed responsive governor device. In the latter case, when train speed is reduced, following a heavy application of the brakes, to a value at which the speed governor is designed to reduce brake cylinder pressure for preventing wheel sliding, the force of the overloaded truck springs pulling the abnormally displaced brake shoes against the wheels must first be withdrawn, sometimes by an initial reduction in brake cylinder pressure of about forty percent, before the brake forces can be controlled with the necessary sensitivity by the desired operation of the speed governor.

It is an object of my invention to provide a brake shoe mounting adapted to obviate the difficulties above described in connection with operation of railway trucks.

Another object of the invention is to provide a railway car truck equipped with brake shoe suspending means so designed as to be free at all times from the effect of relative motion between the truck frame members and the unsprung portions of the truck.

A further object of my invention is to provide a railway truck of the type having equalizing bars supported on journal boxes and equipped with brake shoes supported wholly or in part by the equalizing bars.

Other objects and advantages of the invention will appear in the following more detailed description, taken with reference to the accompanying drawings, wherein Fig. 1 is an elevational view, partly in section, of a portion of a railway truck embodying one form of my invention;

Figure 1:
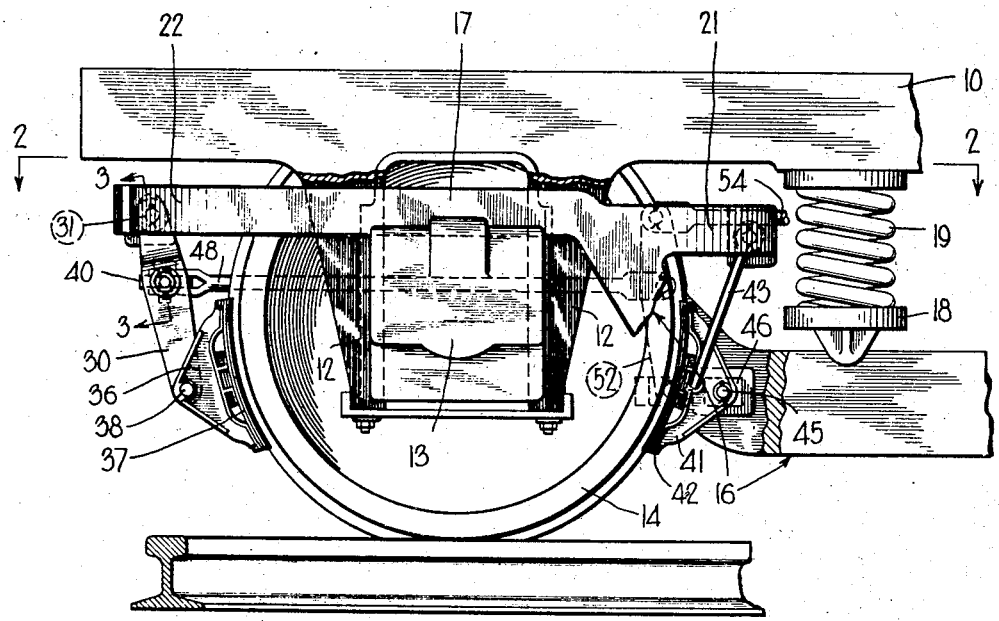
Figure 2:
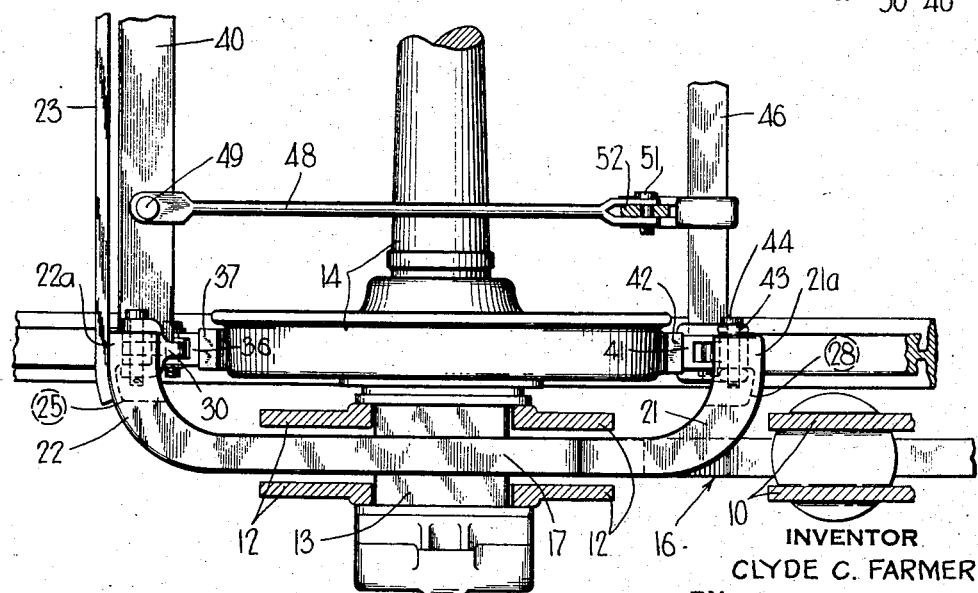
Fig. 2 is a sectional view of a portion of the vehicle truck taken substantially along the line 2—2 of Fig. 1.

*Embodiment shown in Figs. 1 and 2*

Referring to Figs. 1 and 2 of the drawings, there is illustrated in simplified form a portion of a railway truck, including a wheel and the associated elements of the adjacent corner of the truck, it being understood of course that the complete truck is of the type having at least four wheels. Although the truck may be of any suitable construction it is illustrated by a design suitable for a passenger car, and comprises a truck frame having spaced side frame members, one of which is designated 10, and which are connected together by the usual transversely disposed transom, not shown. Pedestal jaw members 12 are secured to each side frame member 10, and have slidably guided therein the usual journal boxes 13 associated with the bearing of the wheel and axle assembly 14. For carrying each of the side frame members 10, there is provided a longitudinally disposed equalizing bar 16 having at each end a suitable off-set portion 17 in rocking engagement with the upper surface of the corresponding journal box 13, and having secured adjacent each offset portion a spring seat 18 upon which rests the usual equalizer spring 19 for supporting the truck frame. In addition to the equalizer springs 19, of which there are usually four, there may be provided suitable elliptic springs, not shown, mounted intermediate the wheel and axle assemblies, or to the right of the wheel 14 as shown in Fig. 1.

According to the invention, the equalizing bar 16 has formed adjacent each wheel an inwardly curving arm portion 21 which extends from the offset portion 17 toward the center of the truck. Each equalizing bar 16 is further provided at each end thereof with an inwardly curving arm portion 22 extending beyond the offset portion 17, and secured to the corresponding arm portion at the end of the other equalizing bar of the truck, not shown, by means of a tie member 23, as shown in Fig. 2 of the drawings. The arm portions 21 and 22 at each end of the equalizing bar are thus adapted to straddle the adjacent wheel of the truck, the respective ends 21a and 22a thereof being somewhat enlarged and disposed at a suitable distance above the center line of the wheel and in alignment with the wheel tread.

Figure 3:
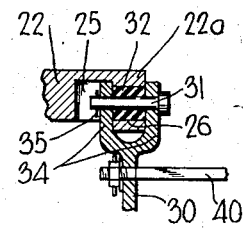
Fig. 3 is an enlarged detail sectional view taken along the line 3—3 of Fig. 1.

As is best shown in Fig. 3 of the drawings, the curved arm 22 of the equalizing bar has formed therein a recess 25 adjacent the outer enlarged end 22a thereof, which enlarged end is provided with a bore 26 opening into the recess 25 and having its axis disposed parallel to that of the wheel and axle assembly of the truck.

As shown in Fig. 2 of the drawings, the arm 21 of the equalizing bar 16 is likewise provided with a recess 28 and a bore in the end 21a similar to the bore 26 of the arm 22 above described.

The curved arms 21 and 22 of the equalizing bar 26 are adapted to support a pair of clasp brake shoes arranged for braking engagement with the corresponding wheel of the truck. Referring to Fig. 1 of the drawings, a hanger lever 30 is suspended from the arm 22 by means of a pin or bolt 31, which as shown in Fig. 3 is preferably mounted in a shock absorbent bushing 32 of rubber or other suitable material secured within the bore 26 of the end 22a of the arm. It will be noted in Fig. 3 that the hanger lever 30 is provided with bifurcated portions 34 having suitable bores through which the pin 31 extends, which bifurcated portions are disposed on opposite sides of the enlarged end 22a of the arm 22. The recess 25 in the arm 22 is adapted to permit insertion of a cotter pin 35 or other suitable means for locking the pivot pin 31 in place.

A brake head 36 carrying a brake shoe 37 is pivotally connected to the lower end of the hanger lever 30 by means of a pin 38, and is adapted for engagement with the tread of the wheel 14. As best shown in Fig. 2 of the drawings, the hanger lever 30 is connected in the usual manner by means of a brake beam 40 with the hanger lever associated with the clasp brake shoe for the other wheel, not shown in the drawings, of the wheel and axle assembly.

At the side of the wheel 14 shown in Fig. 1 opposite the brake shoe 37 there is provided another brake head 41 and brake shoe 42, which head is suspended by means of a hanger 43 from the arm 21 of the equalizing bar 16. It will be understood that the upper end of the hanger 43 is pivotally connected to the end 21a of the arm 21 by means of a suitable pin 44 secured thereto in a manner similar to the mounting already described of the pin 31. The brake shoe 42 is secured by means of a pin 45 to a transversely disposed brake beam 46, the other end of which will be understood to be similarly associated with the corresponding brake shoe of the other wheel of the wheel and axle assembly 14. As shown in Fig. 1, the brake shoes 37 and 42 are disposed somewhat below the horizontal center line of the wheel and axle assembly 14, and are adapted for operation in the usual manner for simultaneously applying braking force to the wheel and axle assembly.

The brake rigging for operating the brake shoes 37 and 42 may include, as shown in Fig. 2 of the drawings, a horizontally disposed brake rod 48 having one end pivotally connected by means of a pin 49 to the brake beam 40 and the other end similarly connected by means of a pin 51 to a live lever 52. As may be seen in Fig. 1, the lower end of the live lever 52 is operatively connected to the brake beam 46 associated with the shoe 42, and the upper end of the live lever is pivotally connected to a pull rod 54 operatively associated with other portions of the brake rigging not shown in the drawings.

In operation, when the usual brake rigging is operated to effect application of the brakes, the pull rod 54 is moved to the right, as viewed in Fig. 1 of the drawings, and in so moving acts through the medium of the live lever 52 and the rod 48 to operate the hanger lever 30 to force the brake shoe 37 into engagement with the wheel 14, while the live lever 52 at the same time operates the brake beam 46 to cause the shoe 42 to engage the wheel. Application of the pair of brake shoes to each wheel of the truck is thus effected in much the same manner as in the case of the usual clasp brake mechanism, but it will be apparent that, since the brake shoes are suspended from arms formed on the equalizing bar 16 instead of from a portion of the frame carried by the truck springs, undesirable downward pull of the truck frame against the springs during application of the brakes, as hereinbefore described, is entirely avoided, regardless of the force with which the shoes are applied to the wheels.

Although the brake shoes are thus suspended from an unsprung portion of the vehicle truck, it will be understood that the shoes and the hanger levers and brake beams associated therewith are, to some extent at least, relieved of road shocks due to the resilient mounting afforded by the rubber pin bushings such as 32, as shown in Fig. 3.

Figure 4:
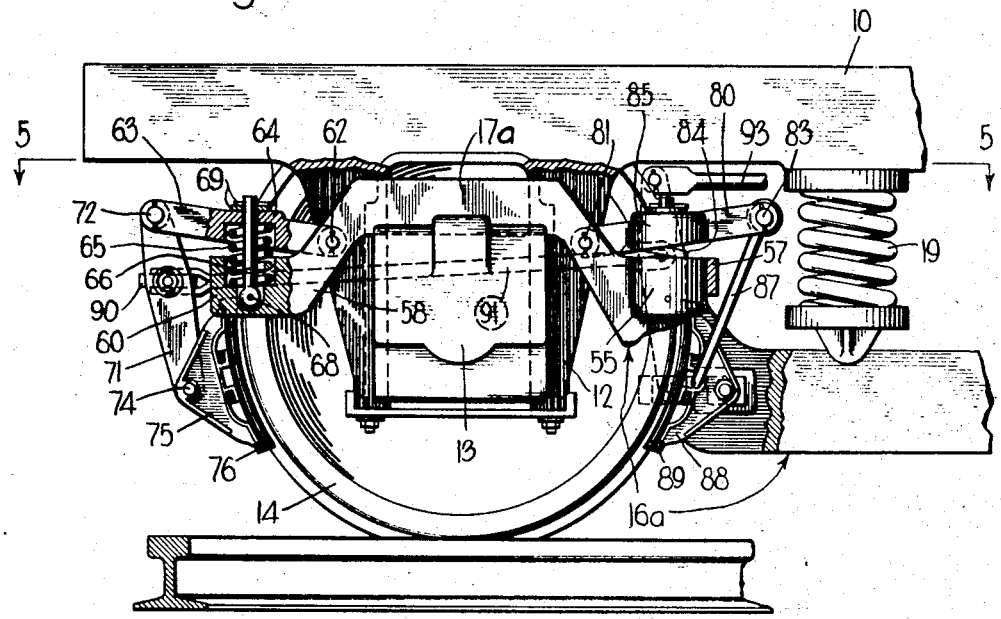
Fig. 4 is an elevational view, partly in section, illustrating another form of my invention applied to a railway truck.
Figure 5:
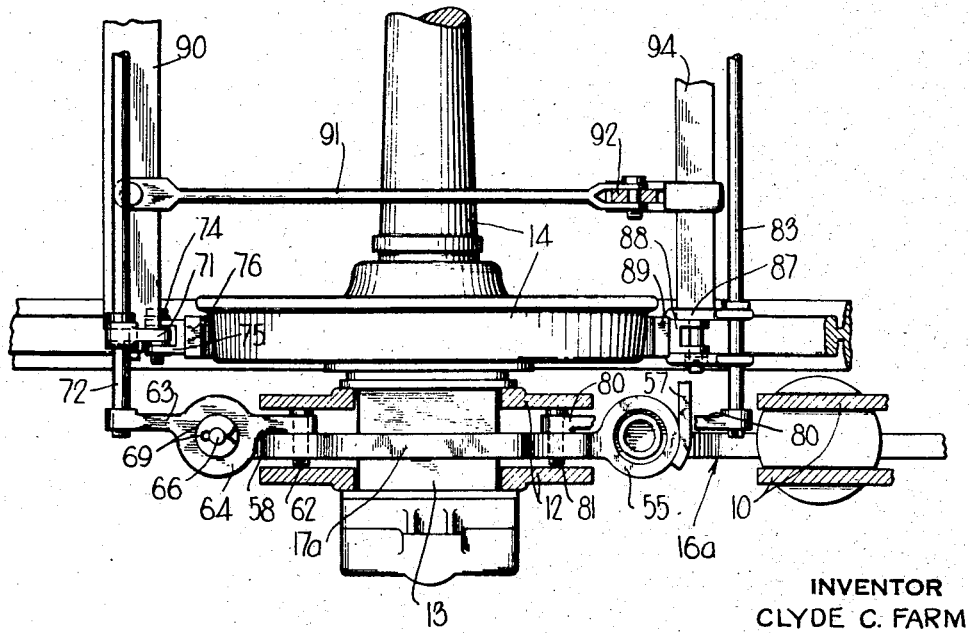
Fig. 5 is a sectional view taken substantially along the line 5—5 of Fig. 4.

*Embodiment shown in Figs. 4 and 5*

For certain classes of railway service, it may be desirable to provide yielding means for supporting a clasp brake mechanism from an unsprung member of the railway truck, such as the equalizing bar. Such an equipment is disclosed in Fig. 4 of the drawings, wherein the truck elements such as the side frame member 10 having pedestals 12, the journal box 13, wheel and axle assembly 14 and the truck springs 19 are substantially the same as those shown in Fig. 1 of the drawings. According to the present embodiment of the invention the truck spring 19 is interposed between the side frame member 10 and an equalizing bar 16a, which has an offset portion 17a carried in rocking engagement in a suitable groove provided on the journal box 13. It will be understood, of course, that the equalizing bar 16a is shown in Fig. 4 in fragmentary form and that the right-hand end thereof, not shown, is similarly constructed.

Formed on the equalizing bar 16a intermediate the lower or central portion and the offset portion 17a thereof is an annular spring seat portion 55, the axis of which is substantially vertically disposed as shown in Fig. 4. If desired, a tie-rod 57 may be secured in any suitable manner to the spring seat portion 55 as shown in Fig. 5, which tie-rod extends transversely of the truck and is secured to the corresponding portion of the other equalizing bar, not shown, for affording rigidity.

Extending outwardly from the opposite side of portion 17a of the equalizing bar is a prolongation 58, which slopes downwardly and carries at the end thereof a spring seat portion 60, which is similar to the spring seat portion 55, and as shown in Fig. 4, is disposed substantially in the same plane.

Pivotally connected to the prolongation 58 of the equalizing bar by means of a pin 62 is a carrier member 63, which is provided with a centrally disposed circular spring seat 64 adapted for alignment with the spring seat 60 of the equalizing bar. The carrier member 63 is normally maintained in a canted position by a coil spring 65, which is interposed between the spring seats 60 and 64 as shown in Fig. 4 of the drawings. A guide rod 66 extends upwardly within the spring 65 through a suitable bore formed in the member 63, the lower end of the rod being pivotally connected to the spring seat 60 by a pin 58. The upper end of the rod 66 extending outwardly of the spring seat 64 may be provided with a washer and cotter pin 69 for limiting upward movement of the carrier member 63 under the force of the spring 65.

The carrier member 63 is secured to one end of a transversely disposed carrier rod 72, which is adapted to support a hanger lever 71, the upper end of which is pivotally connected to the rod and the lowermost end of which is pivotally connected by means of a pin 74 to the usual brake head 75 carrying a brake shoe 76.

At the opposite side of the wheel there is provided a carrier member 80, which has one end pivotally connected by means of a pin 81 to the equalizing bar 16a and is pivotally connected at the other end to a carrier rod 83 extending transversely across the vehicle truck as shown in Fig. 5 of the drawings. The carrier member 80, like the member 63, is normally maintained in a canted position by a spring 84 which is interposed between the spring seat portion 55 of the equalizing bar and a spring seat portion 85 formed on the member 80. A hanger 87 is operatively connected to the carrier rod 83 in alignment with the tread of the wheel 14, and supports a brake head 88 and brake shoe 89 in the usual manner.

The clasp brake mechanism including the shoes 76 and 89 is adapted to be operated to apply and release the brakes through the medium of the usual rigging members including a brake beam 90 connected to the hanger lever 71 intermediate the ends thereof, a rod 91 connected at one end of the beam 90 and at the other end to a live lever 92 which is operable through the medium of a pull rod 93, and a brake beam 9A operatively connected to the lower end of the live lever 92 and to the brake head 88.

The operation of the clasp brake mechanism will be understood from the explanation hereinbefore presented in connection with the embodiment shown in Fig. 1 of the drawings. It will be apparent that the dead weight of the brake shoes and the associated hanger levers and rods is resiliently supported by the springs 65 and 84 while the brakes are in release position as shown in Fig. 4, which springs are thus adapted to absorb vibrations transmitted to the equalizing bar as the wheels of the truck pass over rough spots on the rails. On the other hand, when the brake shoes are applied to the wheel with sufficient force to effect downward travel of the shoes along the wheel in the manner hereinbefore explained, the springs 65 and 84 are adapted to yield to permit the carrier members 63 and 80, respectively, to engage the seat portions 60 and 55, whereupon the further downward displacement of the brake shoes is prevented. When the brakes are again released, by the usual operation of the brake rigging, the respective springs 65 and 84 become effective to return the carrier members 63 and 80 to the positions shown in Fig. 4 for resiliently supporting the brake shoes of the clasp brake mechanism.

It will thus be seen that according to the embodiment of the invention shown in Fig. 4, there is provided a clasp brake mechanism including yielding means for supporting the brake shoes independently of the truck springs, which clasp brake mechanism is operable to apply the brakes to any desired degree of force without causing overloading of the truck springs or undesired displacement of the truck frame.

Figure 6:
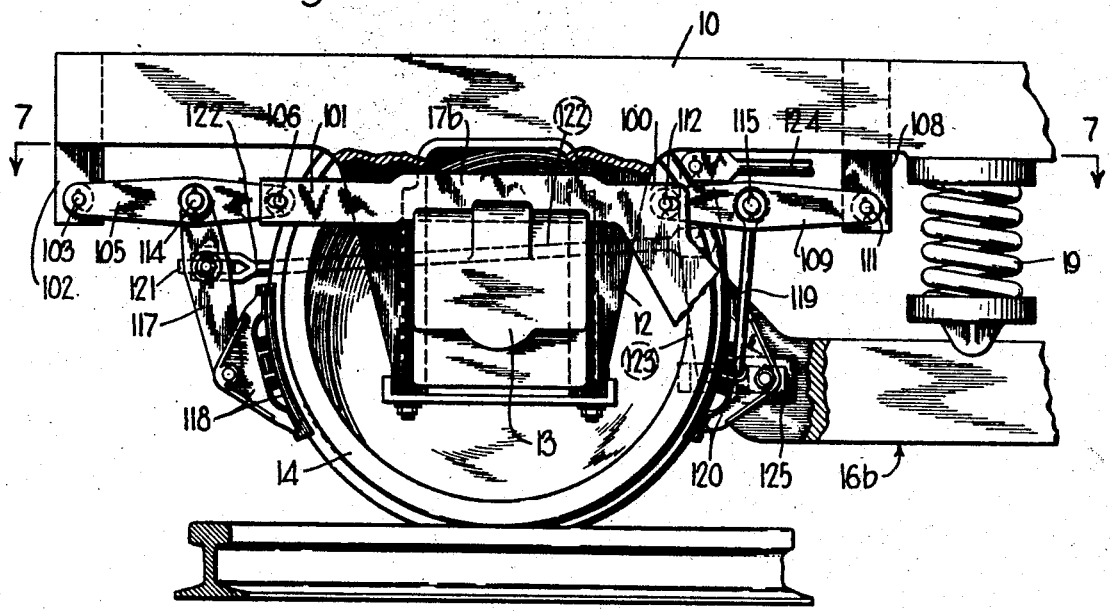
Fig. 6 is an elevational view, partly in section, showing a third form of the invention applied to a railway truck.
Figure 7:
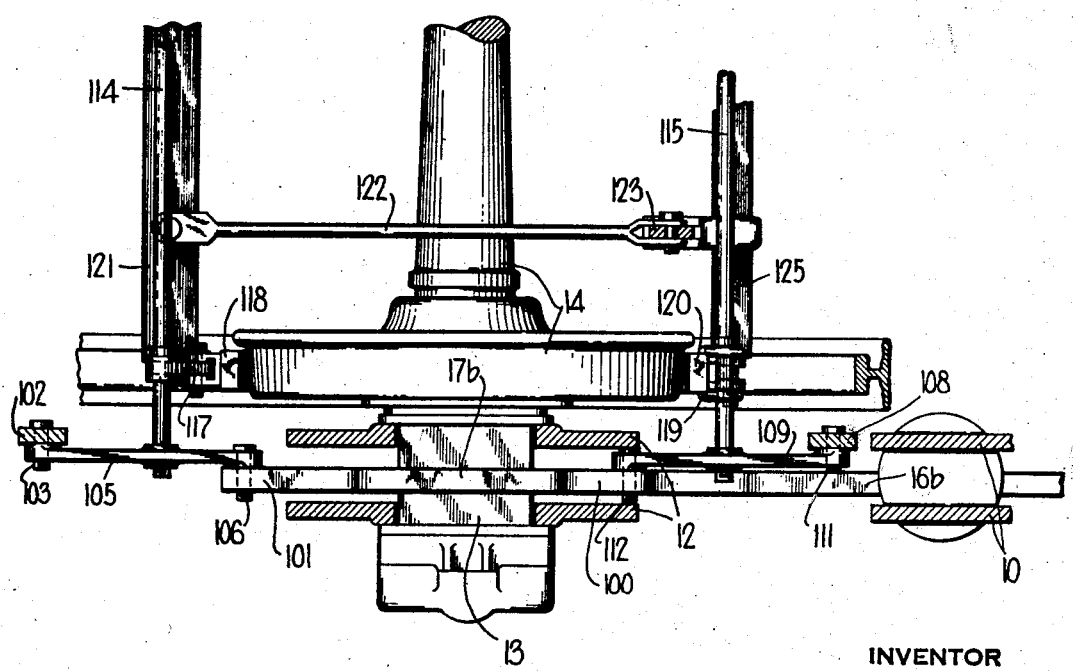
Fig. 7 is a sectional view taken substantially along the line 7—7 of Fig. 6.

*Embodiment shown in Figs. 6 and 7*

A third embodiment of my invention is illustrated in Figs. 6 and 7 of the drawings, in which there is provided a truck including an equalizing bar 16b having an offset portion 17b carried by the journal box 13 of the wheel and axle assembly 14, which equalizing bar is arranged in the usual manner to support the truck frame 10 through the medium of the spring 19. In this form of my invention the clasp brake mechanism is adapted to be supported partly by the unsprung equalizing bar and partly by the spring supported frame.

As is best shown in Fig. 6, the portion of the equalizing bar 16b associated with the wheel and axle assembly 14 has formed thereon a lug 100 which is disposed adjacent the offset portion 17b, and a prolongated portion 101 extending longitudinally from the offset portion 17b and aligned with the lug 100.

Rigidly secured to the end of the truck frame 10 is a bracket member 102 carrying a pin 103 which is pivotally connected to one end of a horizontally disposed link member 105, the other end of which is similarly connected to the prolongated portion 101 of the equalizing bar by means of a pin 106 fitted into a suitable opening formed in that portion.

A bracket 108, similar to the bracket 102, is secured to the side frame 10 intermediate the portion thereof resting on the spring 19 and the usual jaw member 12, the lower end of which bracket 108 is spaced from the lug 100 of the equalizing bar by about the same distance as that between the bracket member 102 and the prolongated portion 101. A link member 109 extends longitudinally from the bracket member to the lug, and is pivotally connected to the bracket 108 by means of a pin 111 and is similarly connected to the lug 100 by means of a pin 112.

The link members 105 and 109 thus movably connected to the truck frame and to the equalizing bar are adapted to support the clasp brake mechanism for the adjacent wheels, and as shown in Fig. 7, are arranged for cooperation with the corresponding link members of the opposite side of the truck by means of a transversely disposed tie-rod 114, which is connected to the link member 105 intermediate its ends, and a similar tie-rod 115, one end of which is connected to the middle portion of other link member 109.

The clasp brake members associated with the equipment shown in Fig. 6 may be similar in construction to those hereinbefore described, and may include a hanger lever 117 journaled on the tie-rod 114 for supporting a brake head and shoe 118, and a hanger 119 operatively connected to the tie-rod 115 and carrying a brake head and shoe 120. The hanger lever 117 is operatively connected to the usual brake beam 121 which is in turn connected through the medium of a rod 122 with a live lever 123, the upper end of which is pivotally connected to a pull rod 124. The lower end of the live lever 123 is operatively connected to a brake beam 125 to which is operatively secured the brake head 120.

When the brakes are applied by operation of the mechanism in the usual manner, the force tending to cause the brake shoes to move downwardly along the tread of the wheel, as hereinbefore explained, will be distributed through the medium of the respective link members 105 and 109 to both the equalizing bar and the truck frame. It will thus be apparent that since only a portion of the downward force acting on the shoes is transmitted to the frame, the possibility of excessive downward displacement of the frame and overloading of the truck springs is minimized. On the other hand, the construction and arrangement of the brake shoe mounting elements are such as to provide yielding support for the brake shoes while the brakes are in release position.

While several embodiments of the invention have been described in detail, it is not my intention to limit its scope to those embodiments or otherwise than by the terms of the appended claims.

Having now described my invention, what I claim as new and desire to secure by Letters Patent, is:

1. A brake mechanism for a railway truck of the type including a wheel and axle assembly and an equalizer supported thereby, comprising a brake element operable into and out of braking relation with the wheel and axle assembly, a movable hanger member for carrying said brake element, operating members connected to said hanger member, and mounting means resiliently supporting said brake element, hanger member and operating member from said equalizer.

2. A brake mechanism for a railway truck of the type including a wheel and axle assembly and an equalizer supported thereby, comprising a brake element operable into and out of braking relation with the wheel and axle assembly, a hanger member carrying said brake element, and yieldable mounting means therefor including an element pivotally connecting said hanger member to said equalizer.

3. In a railway truck comprising a frame, a wheel and axle assembly and an equalizing bar journaled on said wheel and axle assembly, the combination of yielding means carried by said equalizing bar, a brake element, and a hanger member carrying said brake element and supported by said yielding means and said equalizing bar.

4. In a railway truck including a wheel and axle assembly, a journal box therefor, and an equalizing bar supported by said journal box and having bracket portions formed thereon on opposite sides of said journal box, the combination with said equalizing bar of a clasp brake mechanism comprising brake shoes operable into and out of braking relation with said wheel and axle assembly, hanger members supporting said shoes from said bracket portions, and shock absorbing means interposed between said hanger members and said bracket portions.

5. In a railway truck, in combination, wheel and axle assemblies having laterally projecting journal portions, longitudinally disposed equalizing bars supported on said journal portions and having inwardly extending arm portions arranged in pairs adapted to straddle each wheel of said wheel and axle assemblies, and clasp brake mechanism suspended from said arm portions and adapted for cooperation with said wheel and axle assemblies.

6. In a railway truck of the type including wheel and axle assemblies having journal boxes, and longitudinally disposed equalizing bars mounted on said journal boxes, the combination therewith of brackets carried by said equalizing bars adjacent said wheel and axle assemblies, rods disposed transversely of the truck and having their ends secured to corresponding brackets of each of said equalizing bars, brake hangers pivotally connected to said transversely disposed rods adjacent each of said wheels, and brake shoe elements carried by said hangers and operable into and out of braking relation with said wheels.

7. In a railway truck including a wheel and axle assembly, a journal therefor, and an equalizing bar supported on said journal, the combination therewith of spring means mounted on said equalizing bar, a brake shoe element, and a hanger member supporting said brake shoe element from said spring means.

8. In a railway truck including spring means, a frame, and a wheel and axle assembly, in combination, an equalizer adapted to support said frame through the medium of said spring means and having an offset portion journaled on said wheel and axle assembly, springs carried on said equalizer at each side of said offset portion, movable members supported on said springs, and brakes supported from each of said movable members and adapted for operation into braking relation with said wheel and axle assembly.

9. In a railway truck including spring means, a frame, and a wheel and axle assembly, in combination, an equalizer adapted to support said frame through the medium of said spring means and having an offset portion journaled on said wheel and axle assembly, springs carried on said equalizer at each side of said offset portion, longitudinally disposed carrier members having their inner ends pivotally connected to said equalizer and yieldingly supported on said springs, respectively, hanger members pivotally connected to the free ends of said carrier members, and brakes supported by said hanger members for operation into braking relation with said wheel and axle assembly.

10. In a railway truck including spring means, a frame, and wheel and axle assemblies, in combination, longitudinally disposed equalizers adapted to support said frame through the medium of said spring means and having offset portions journaled on said wheel and axle assemblies, springs carried on said equalizers on opposite sides of each offset portion, movable members supported on said springs, respectively, transversely disposed tie rods connecting each movable member adjacent each wheel to the corresponding movable member adjacent the other wheel of the same assembly for minimizing lateral displacement of said members, and brakes hung from said tie rods and adapted for operation into braking relation with said wheel and axle assemblies.

11. In a railway truck of the class including wheel and axle assemblies, journal boxes therefor, longitudinally disposed equalizing bars carried by said journal boxes, and a frame spring-supported on said equalizing bars, the combination therewith of clasp brake mechanisms comprising brake supporting members disposed in pairs on opposite sides of said wheel and axle assemblies, each of said brake supporting members having one end thereof pivotally connected to said frame and the other end thereof pivotally connected to the adjacent equalizing bar for permitting the usual movement of said frame relative to said equalizing bar, brake hanger means pivotally connected to said supporting members intermediate the ends thereof, and brakes carried by said hanger means and adapted for braking relation with said wheel and axle assemblies.

12. Brake mechanism for a railway truck of the class including wheel and axle assemblies, equalizing bars having offset portions journaled on said assemblies outwardly of the wheels thereof, springs carried by said equalizing bars, and a frame supported on said springs, said brake mechanism comprising carrier members disposed above the longitudinally center line of each wheel and adjacent opposite sides thereof, each of said carrier members having one end pivotally connected to one of the offset portions of the adjacent equalizing bar and the other end pivotally connected to said frame, transversely disposed rods connecting laterally aligned pairs of said carrier members intermediate the ends of each, and clasp brakes hung from said rods adjacent each wheel of said wheel and axle assemblies.

13. In a railway truck including a wheel and axle assembly carrying a spring-supported frame, in combination, an unsprung member journaled on said wheel and axle assembly and having oppositely projecting arm or lug portions, carrier members pivotally connected to said arm portions and to said frame and disposed above opposite sides of each wheel, and clasp brake mechanism operatively supported by said arm portions for braking relation with said wheel and axle assembly.

14. In a railway truck of the class including wheel and axle assemblies, springs, and a truck frame, the combination of equalizing bars journaled on said wheel and axle assemblies and arranged to support said frame through the medium of said springs, said equalizing bars having bracket portions formed thereon adjacent each wheel of said wheel and axle assemblies, brake shoes, movable hanger members for carrying said brake shoes in operative alignment with said wheel and axle assemblies, and shock absorbing elements secured to the bracket portions of said equalizing bars in supporting relation with said hanger members, said elements being constructed and arranged to permit limited displacement of said hanger members and shoes with respect to said equalizing bars, for thereby minimizing vibration of said associated parts of the truck while relieving said wheel and axle assemblies of pounding under the full dead weight of said hanger members and shoes.

15. In a railway truck of the class including wheel and axle assemblies, springs, and a truck frame, the combination of equalizing bars journaled on said wheel and axle assemblies and arranged to support said frame through the medium of said springs, said equalizing bars having bracket portions formed thereon adjacent each wheel of said wheel and axle assemblies, brake shoes, hanger members for carrying said brake shoes in operative alignment with said wheel and axle assemblies, and shock absorbing elements formed of rubber or the like interposed between said bracket portions and said hanger members, said elements being adapted to permit limited displacement of said hanger members and shoes with respect to said equalizing bars, for thereby minimizing vibration of said associated parts of the truck while relieving said wheel and axle assemblies of pounding under the full dead weight of said hanger members and shoes.

CLYDE C. FARMER.